June 18, 1940.  E. J. KEARNEY ET AL  2,205,361
DIVIDING HEAD
Original Filed March 6, 1933  3 Sheets-Sheet 3

INVENTORS
Edward J. Kearney
BY Joseph B. Armitage
Fred G. Parroux
ATTORNEY

Patented June 18, 1940

2,205,361

UNITED STATES PATENT OFFICE 2,205,361

DIVIDING HEAD

Edward J. Kearney, deceased, late of Wauwatosa, Wis., by Ella Morton Kearney, Albert J. Pitman, and Otto W. Carpenter, Jr., executors, Wauwatosa, Wis., and Joseph B. Armitage, Wauwatosa, Wis., assignors to Kearney & Trecker Corporation, West Allis, Wis., a corporation of Wisconsin Continuation of application Serial No. 659,828, March 6, 1933. This application June 15, 1936, Serial No. 85,446

16 Claims. (Cl. 90—57)

This invention relates, generally, to attachments for milling machines or similar machine tools, and more particularly to a device of the type generally known as an indexing or dividing head.

The present application is a continuation of application Serial No. 659,828, filed March 6, 1933.

A general object of this invention is to provide an indexing or dividing head of improved construction that is convenient to operate and that is adapted to effect indexing operations with a high degree of precision.

Another object of the invention is to provide in a dividing head, improved clamping means that function to clamp the rotatable elements thereof rigidly and accurately in adjusted position without disturbing the predetermined adjustment thereof.

Another object is to provide improved clamping means for the spindle of a dividing head that may be clamped thereon to lock it in adjusted position without exerting force tending to turn the spindle during the clamping action.

Another object is to provide an improved clamping means for the swivel trunnions of an indexing head.

Another object is to provide improved clamping means for locking an indexing plate in adjusted position on an indexing head.

A further object of the invention is to provide an improved indexing plate of novel construction for a dividing head.

Further objects are generally to simplify and improve the construction and operation of dividing heads and still other objects will be apparent from the following detailed description of the embodiment of the invention shown in the accompanying drawings, in which.

Figure 2:
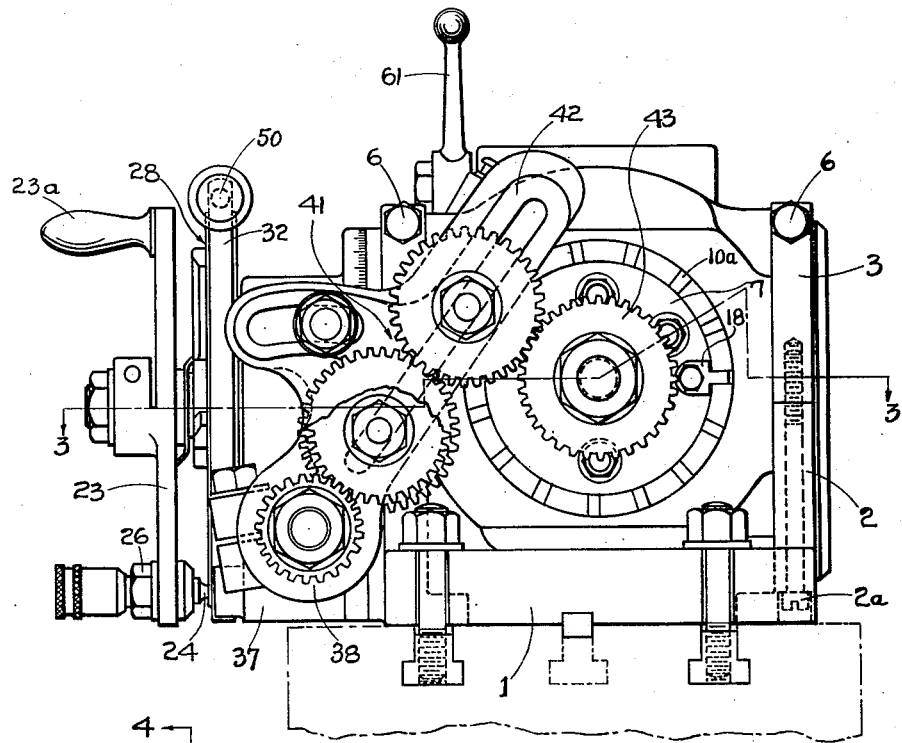
Fig. 2 is a view of the dividing head in end elevation, taken from the right in Fig. 1.
Figure 3:
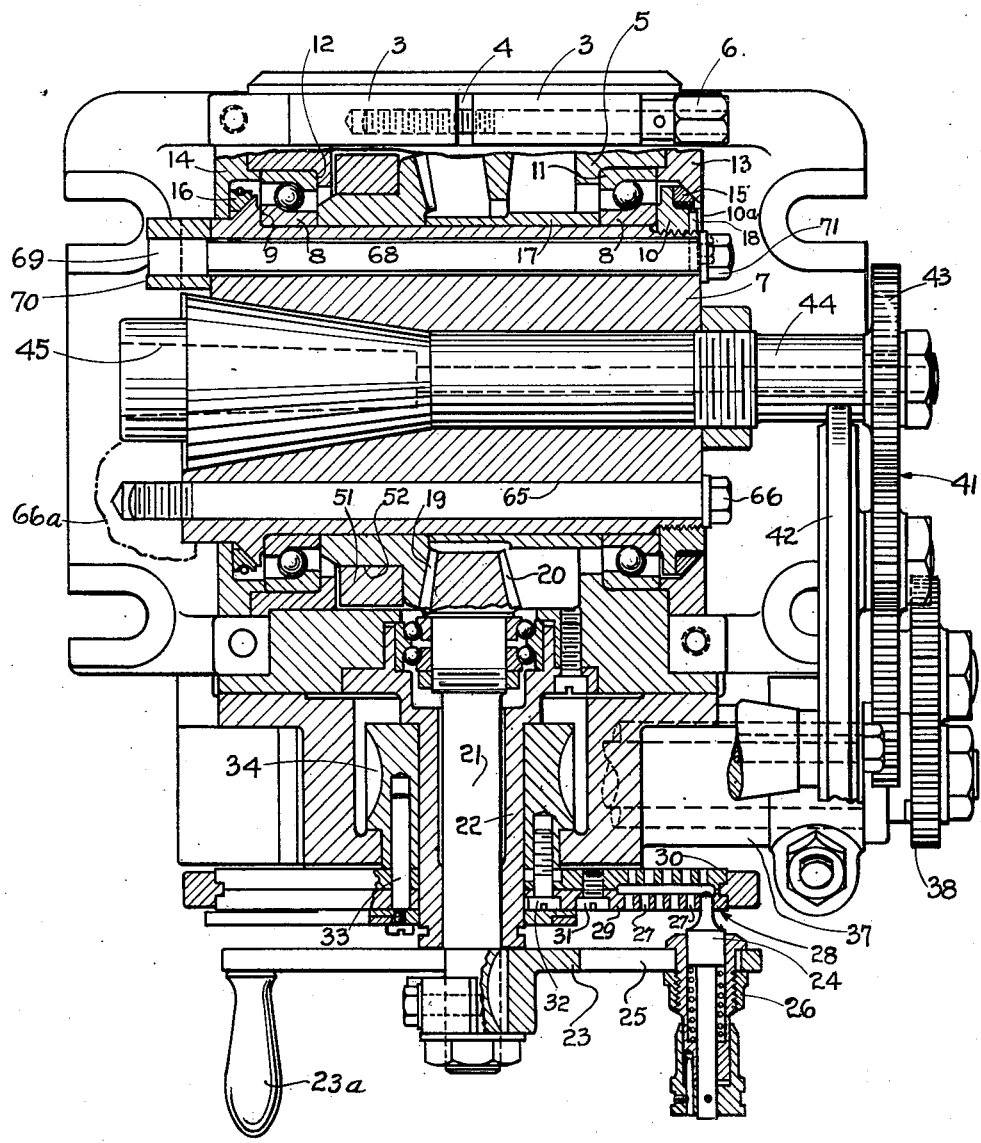
Fig. 3 is an enlarged plan view, mostly in horizontal section taken along the line 3—3 of Fig. 2.

The dividing head, as here shown, includes a frame or base 1 adapted to be fixed to the table of a milling machine or other machine tool by means of bolts, as shown in Fig. 2. Formed integrally with the base 1 are two semi-circular trunnion cradles or bearing surface portions 2 upon which are removably secured by screws 2a other complementary trunnion bearing or clamping portions 3 made of resilient material in two parts or quadrant elements which do not quite come together at the top, thus providing a severing space 4 between the upper ends thereof, as shown in Fig. 3. The two trunnion bearings rotatably retain the opposed trunnions of a block 5 swivelled therein and which may be clamped in position by tightening clamping bolts 6 connecting the top ends of the quadrants. When the clamping bolts 6 are tightened, each draws the two clamping quadrant portions 3 of its associated trunnion bearing together in manner tending to close the space 4 between them and to thereby rigidly embrace the associated trunnion. As the spaces 4 between the trunnion clamping portions 3 are at the tops of the trunnion bearings, and as the weight of the block 5 causes the trunnions thereof to rest in the lower trunnion bearing cradle portions 2, the action of clamping the trunnions by closing the spaces 4 may be accomplished without exerting on the trunnions any force tending to turn them within their associated cradles. Consequently the block 5 may be adjusted to a predetermined angular position and then clamped rigidly without changing the adjustment thereof in the least.

Rotatably mounted in the swivel block 5 is a work spindle 7, supported by two anti-friction bearings 8, each being adapted for radial loading and the two respectively being adapted for thrust loading in opposite directions. The thrust loads on the spindle 7 are transmitted by a shoulder 9 and a nut 10 to the respective bearings 8 which, in turn, act upon the block 5 against shoulders 11 and 12 and retaining rings 13 and 14 that are fastened to the ends of the block by suitable screws (not shown), there being lubricant retaining and coolant or dust excluding rings 15 and 16 of cork or felt to seal the joints therebetween.

The anti-friction bearings 8 are heavily pre-loaded by means of the nut 10 threaded on the spindle, a spacing collar 17 being finished at its ends to give the desired pre-loading when the nut is set up solidly under heavy pressure by means of a wrench applied to slots 10a of the nut, the nut then being locked in position by a key 18 fastened to the spindle 7 and fitting in one of the slots 10a of the nut 10. By reason of the pre-loaded anti-friction bearings, it requires an extremely heavy load, sufficient to distort all or nearly all of the balls of one or both of the bearings, to cause the spindle 7 to change its predetermined axial or transverse relation to the block 5 in even slight degree, yet the spindle is freely rotatable about its axis.

Fixed with the spindle 7 is a bevel gear 19 engaged by a bevel pinion 20 on a shaft 21 that extends at right angles to the spindle and that is carried by a bracket or sleeve 22 fixed in block 5. Shaft 21 carries an index lever 23 provided with a handle portion 23a, and a spring pressed plunger 24 adjustable by means of a slot 25 and a nut 26 to permit the plunger 24 to engage with spaced holes 27 arranged in circles of different diameters in a unitary index plate generally denoted by the numeral 28.

The index plate 28 is constructed by joining two disks 29 and 30 by means of screws 31, each disk having a plurality of circles of spaced holes, and each circle containing a different number of holes. The several circles may all be made available by reversing the plate 28 as may be necessary to present the one or the other face thereof to the index plunger 24, the plate 28 being retained by screws 32 and a dowel 33 in a manner permitting reversal thereof.

The disks 29 and 30 of the plate 28 are each recessed or cut away slightly upon one surface in the region between the center portion and the rim portion thereof, and they are placed together with the relieved surfaces justaposed in manner to form a narrow annular chamber or clearance space between the two disks in the region occupied by the indexing holes, as shown in Fig. 3. The indexing holes in each disk extend entirely through the disk into communication with the annular clearance space. By reason of this construction it is feasible, in making the reversible index plate, to ream each of the holes entirely through thereby insuring a high degree of accuracy. Further, if in operation foreign matter should collect in the indexing holes, it will be pushed through by the indexing plunger 24 into the clearance space without causing interference with the accuracy of operation of the device.

The index plate 28 is removably attached by the screws 32 to the hub of a worm wheel 34 that a rotatably mounted on sleeve 22 and that is engaged by a cooperating worm 35 keyed on a shaft 36 which is carried by a bracket 37 fixed with the base 1. The worm 35 may be of any suitable construction but it is preferably of the adjustable type disclosed and claimed in Patent No. 2,002,644 issued May 28, 1935.

Figure 7:
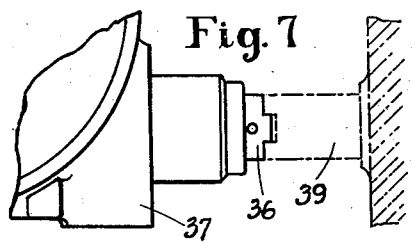
Fig. 7 is a fragmentary view showing power driving means associated with the dividing head.

The shaft 36 is provided with an end construction adapted to receive thereon a gear 38 or to provide a coupling for connection with a power source 39, as shown in Fig. 7, for power rotation of the spindle. The gear 38 is used when it is desired to couple the shaft 36 with the spindle 7 for differential indexing, and in such case gear 38 together with the other gearing shown constitutes a rate changer, generally denoted by the numeral 41, the separate gear elements of which are reversible and interchangeable, a part of the elements being supported by an adjustable bracket 42, and a final or spindle gear 43 thereof being supported by an arbor member 44 fixed in a central axial bore of the spindle 7 and which, in turn, provides a tapered bore 45 which may be used to retain an ordinary work center, (not shown).

Figure 1:
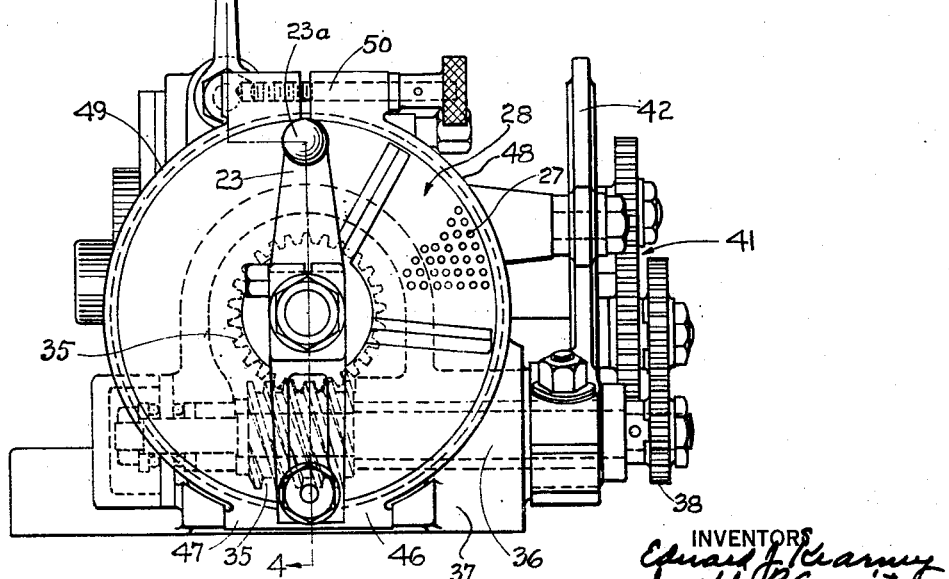
Figure 1 is a view in front elevation of a dividing head incorporating the invention.

For rigidly fixing the position of rotation of the index plate 28 with respect to the base 1, clamping means are provided to lock the plate to the base. As shown in Fig. 1, a bracket 37 extending from the base provides a slot for retaining depending ears or lugs 46 and 47 of semi-circular clamping ring portions 48 and 49, respectively, that are adapted to grip the periphery of plate 28 when drawn together by means of a screw 50. The ring portions 48 and 49 constitute separate clamping shoe elements and the ears 46 and 47 thereof are fitted loosely in the slot of the bracket 37 when in unclamped condition, in such manner that the elements may freely move into clamping position when the screw 50 is tightened, without exerting the slightest tendency to rotate the index plate out of its predetermined adjusted position during a clamping operation. The clamping shoes 48 and 49 are provided with inwardly projecting tongues that fit into a peripheral groove of the plate 28 formed between the outer edges of the two disks 29 and 30, as shown in Fig. 3, to retain the shoes upon the plate when in unclamped condition.

Figure 4:
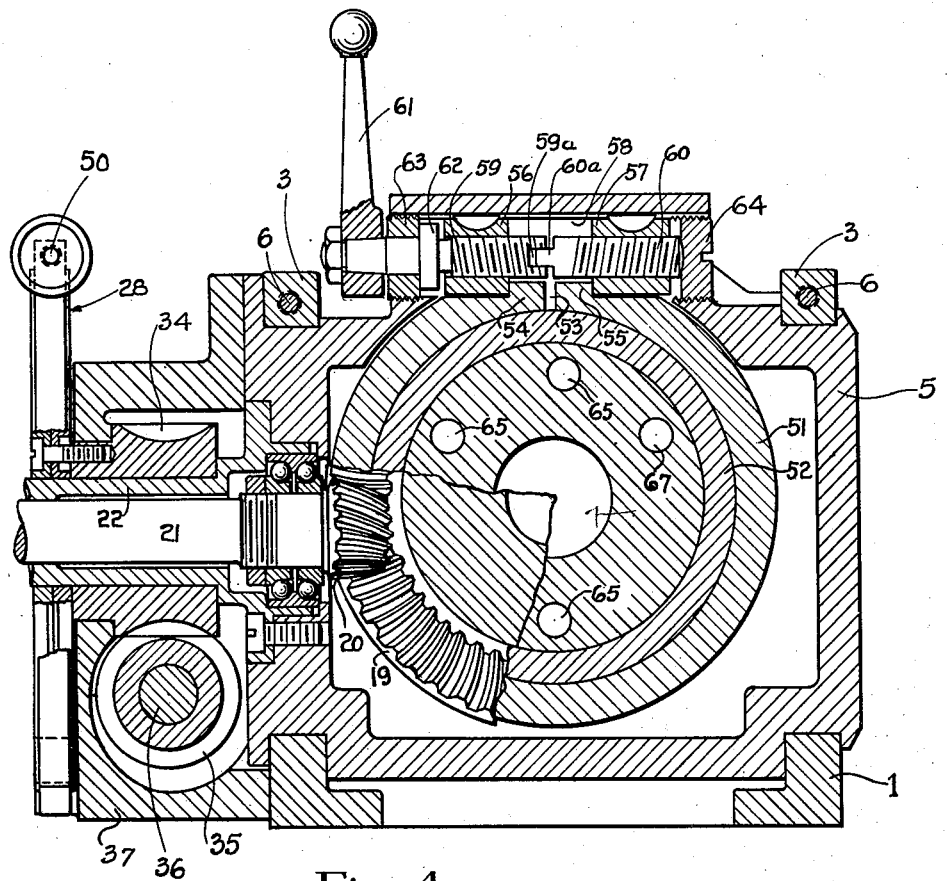
Fig. 4 is an enlarged view partly in end elevation and partly in vertical section, mainly taken along the line 4—4 of Fig. 1.

Improved clamping means are also provided for rigidly fixing the position of rotation of the spindle 7 with respect to the block 5. As shown in Fig. 4, a discontinuous resilient ring member 51 is arranged to be contracted to tightly grip a cylindrical hub 52 of the gear 19, the ring being interrupted by a severing slot 53 and provided with ears or lugs 54 and 55 that constitute abutments for engagement by clamping members 56 and 57 slidably keyed in a bore 58 in the base 1. The clamping members are threaded to receive clamping bolts 59 and 60, which are relatively axially movable but adapted for the one to turn the other by means of a key 60a on the bolt 60 that is fitted in a slot 59a in the bolt 59. The clamping bolt 59 carries a hand lever 61 and has a shoulder 62 adapted for engaging an abutment member 63, and the end of the clamping bolt 60 is arranged to bear independently in the other direction against an abutment member 64, the two abutment members being fixed with block 5. The clamping bolts 59 and 60 are provided with threaded portions of equal pitch but of opposite lead, and when the lever 61 is turned in appropriate direction they exert thrusts oppositely against the abutment members 63 and 64 to move both the clamping members 56 and 57 simultaneously and equally against the ears 54 and 55 with equal pressure, whereby the ring 51 will be contracted by closing the severing slot 53 equally from each side thereof and therefore will have no tendency to rotate the spindle 7 from its adjusted position during the clamping operation.

The spindle 7 is of sufficiently large diameter to provide for a series of angularly spaced bolt holes 65 that extend longitudinally through the spindle from front to rear thereof and are adapted to receive attaching bolts 66 for rigidly connecting such work holding devices as face plates or chucks to the front end of the spindle, a portion of such a device, having threaded openings for engaging the bolts, being shown at 66a, Fig. 3 attached to the spindle end. As may be seen in the drawings, the bolt holes 65 are spaced radially outward from the central bore of the spindle 7 and are angularly spaced to so position the bolts 66 as to enable them to draw a work holding device tightly against the front end of the spindle at a plurality of spaced positions. The bolts 66 may be tightened by turning the heads thereof at the rear end of the spindle to seat them against the spindle face and to thereby exert tension to retain the work holding device in rigid connection with the front end of the spindle.

Figures 5, 6:
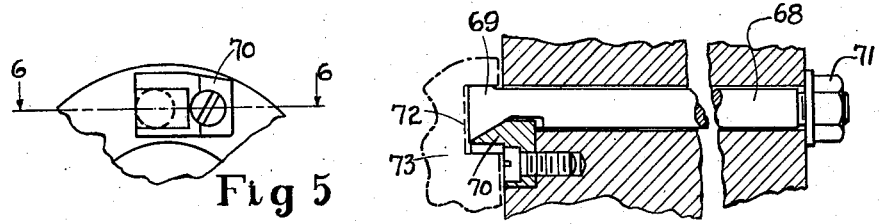
Fig. 5 is a fragmentary view of the front of an indexing spindle, showing an arbor driving means.
Fig. 6 is a fragmentary view in section through the spindle, taken along the line 6—6 of Fig. 5.

Another similar bolt hole 67 is provided in the spindle 7 between two of the bolt holes 65 to loosely receive a bolt 68, Figs. 3, 5, and 6, that constitutes part of a driving means for supplemental parts. As shown, the bolt 68 is provided with an angular head portion 69 adapted to engage a complementary abutment 70 mounted on the front end of the spindle, the two elements presenting parallel outer faces that together provide a driving key which is expansible. The key may be expanded, by tightening a nut 71 at the other end of the bolt 68, in manner to fit it without lost motion into a slot 72 such as is ordinarily provided for driving an arbor or the like, a portion of which is shown at 73.

When the block 5 is swivelled to position the spindle axis vertically, it is desirable that the distance from the bottom of the base to the nose of the spindle should be as small as possible. In part this provides for reduced overhanging of the spindle and greater rigidity, but even more important is the fact that it permits of using a relatively low tool spindle in the knee type milling machines with which these heads are customarily used. In the present head the distance from the bottom of the base to the nose of the spindle is relatively small, partly for the reason that the axis of the spindle is offset from the axis of the swivel block whereby the height, when the spindle is vertical, is less than it would otherwise be by the amount of the offset, and partly because the distance from the axis of the swivel block 5 to the front end of spindle 7 is materially reduced by the work holder fastening construction which avoids the necessity for providing ordinary forms of spindle coupling devices, such as threaded collars or the like, at the front end of the spindle. Coupling devices of this nature, which would lengthen the distance from the block axis to the spindle front end, are entirely avoided by utilizing the fastening means of this invention, wherein bolts are passed through the spindle from end to end thereof.

From the foregoing description of the illustrated embodiment of this invention, it is apparent that there has been provided an improved dividing head of novel design that is capable of performing indexing operations with a high degree of precision. To this end the clamping means for the various rotatable elements of the improved dividing head, according to this invention, are so arranged that they may be clamped without exerting any force tending to turn the element being clamped.

Although only one embodiment of the invention has been shown and described, it is to be understood that those skilled in the art may incorporate the principles herein set forth in various other structural forms, without departing from the spirit and scope of the invention as defined in the subjoined claims.

Having been now fully revealed, the invention is hereby claimed as follows:

1. In an indexing device, the combination with a base presenting semi-circular trunnion receiving surfaces, of a swivel block having trunnions disposed to rotatably engage said trunnion receiving surfaces, clamping means for each trunnion including a pair of quadrant elements jointly forming a complementary semi-circular surface one end of each element being secured to said frame in continuation of said trunnion receiving surface and the other ends of said pair of elements being spaced apart to define a slot disposed in a vertical axial plane of said trunnion, and means for drawing the ends of said clamping elements toward each other in manner tending to close said vertical slot therebetween to clamp said trunnion without exerting force thereon tending to turn said block relative to said base.

2. In a dividing head, the combination with a frame provided with a pair of semi-circular trunnion cradles, of a swivel block having trunnions disposed to rotatably rest in said trunnion cradles, trunnion clamping means associated with each of said trunnions, each of said clamping means comprising two quadrant elements of resilient material fastened to said frame in position to overlie one of said trunnions and with the adjacent upper ends thereof in spaced relation, and means arranged to draw said spaced ends toward each other, whereby said clamping means are caused to engage the associated trunnion to clamp it with equalized pressures forcing it downward into its associated cradle without tendency to turn said trunnion within said cradle.

3. In a dividing head having a frame and an indexing plate provided with a peripheral groove, means for clamping said plate in predetermined position, comprising two semi-circular clamping shoes having inwardly extending tongues disposed to engage said peripheral groove to retain said shoes in engaging relation with said plate, means disposed on said frame to engage each of the lower adjacent ends of each of said clamping shoes in manner to limit the movement thereof in direction away from the adjacent end of the other shoe, and means engaging the upper adjacent ends of said shoes and operative to draw said ends towards each other, whereby said lower shoe ends are moved apart each into engagement with its associated limiting means on said frame after which said shoes are caused to clamp said plate without exerting force tending to turn it from its predetermined position.

4. In a dividing head, a frame, an indexing plate mounted for rotation on said frame said plate being constituted by two disks fastened together and forming therebetween a peripheral clamping groove, and clamping means for locking said plate to said frame in predetermined position relative thereto, said clamping means including a pair of semi-circular clamping elements disposed to encircle said plate and engaging said peripheral clamping groove each of said clamping elements having a lug extending radially at each end thereof, abutments on said frame in position to engage said lugs at adjacent ends of said clamping members in manner to limit separation thereof, and a screw and nut mechanism engaging the lugs at the other adjacent ends of said clamping members in manner to draw them toward each other, whereby when said screw and nut mechanism is tightened said lugs at the other ends of said members are moved into engagement with said abutments and said members are then clamped around said plate without angular displacement of said plate relative to said frame.

5. In an indexing head, a frame, an indexing plate mounted for rotation on said frame, and clamping means for locking said plate in predetermined angular relation to said frame, said clamping means comprising two semi-circular clamping shoes each having an outwardly projecting lug at each end and said shoes being disposed to encircle said indexing plate with said lugs positioned at the upper and the lower sides of said plate respectively, a pair of abutments on said frame in position to engage said lower lugs in manner to retain said lugs loosely therebetween, and means engaging said upper lugs to draw them together forcing said lower lugs apart and into engagement with said abutments, whereupon said clamping shoes are clamped around said indexing plate to lock it securely with equal pressure upon each side thereof and without angular displacement of said plate relative to said frame.

6. In an indexing head, a base, a block carried by said base, a spindle rotatably mounted in said block and presenting a cylindrical clamping surface, a discontinuous resilient clamping ring encircling said cylindrical clamping surface and having a pair of lugs at the ends thereof for contracting said ring, a pair of clamp members slidably mounted in said block in position to engage said lugs to contract said ring, a pair of oppositely threaded elements having threaded engagement with said clamping members respectively and each having an independent bearing upon said block, and means for turning said threaded elements simultaneously to move said clamping members equally thereby effecting equal movements of the ends of said clamping ring for clamping said spindle without angular movement of said spindle relative to said block.

7. In a dividing head having a frame and a work supporting spindle, means for clamping said spindle to said frame to prevent turning thereof, comprising a discontinuous ring encircling said spindle and presenting a severing opening in the upper side thereof, and a pair of interconnected independent actuating members mounted on said frame and disposed to act upon the respective ends of said ring from opposite directions simultaneously to contract said ring in positive manner tending to close said opening equally relative to said frame from each side thereof, thereby causing said ring to engage and clamp said spindle without exerting force tending to turn said spindle from its predetermined position.

8. An index head for indexing a workpiece and rigidly holding it in accurately predetermined position, comprising a frame presenting rigid semi-circular cradle bearings, a swivel block having trunnions resting in said cradle bearings for tilting movement in a vertical plane, a clamp for each trunnion each clamp including a pair of quadrant sectors each fastened at one end to said frame at the respective sides of the trunnion with the other ends thereof closing into proximate spaced relationship at the top of the trunnion, and a clamping device disposed to engage the adjacent ends of the quadrant sectors and adapted to be tightened to cause the sectors to grip the trunnion in cooperation with said rigid cradle bearings, whereby said trunnions may be clamped without disturbing the position of said block relative to said frame.

9. An index head comprising a frame, an indexing crank journalled in said frame, an indexing plate mounted on said frame for rotation concentric with said crank and in cooperating relationship therewith, said plate comprising two disks secured together in spaced relationship in manner to provide therebetween a peripheral clamp-receiving groove, a pair of semi-circular clamping elements each complementary to the periphery of said plate and having an inwardly extending tongue disposed to engage the peripheral groove formed between the disks of said plate, said clamping elements each having means at one end disposed to engage said frame to limit movement of said elements away from each other, and means for engaging the other ends of said clamping elements to draw them together to clamp said plate to said frame.

10. A dividing head comprising a frame, an indexing shaft journalled in said frame, an indexing crank mounted on the outer end of said indexing shaft, an indexing plate disposed in cooperating relationship with said crank, said plate being formed of two disks secured together with their peripheral edges spaced to present a groove, two arcuate clamping elements disposed to engage the peripheries of said disks, each of said clamping elements having a tongue entering the groove between said discs, means on said frame disposed to engage one end of each of said clamping elements to limit movement of said ends in direction away from each other, and a clamping screw arranged to engage the other ends of said elements and operative to draw said ends toward each other to bring said elements into clamping engagement with said indexing plate to clamp it to said frame without moving it angularly.

11. A dividing head comprising a frame, a work supporting spindle unit, preloaded anti-friction bearings disposed to support said spindle unit in said frame in manner to prevent axial or transverse movement thereof but permitting rotation thereof about its axis, a clamping ring presenting a severing opening disposed to encircle said spindle unit and adapted to clamp it, independent actuating means disposed to engage each end of said severed ring to move said ends toward each other relative to said frame, and means to correlate the actions of said independent ring engaging means in manner to effect equalized movements toward each other of the ends of said ring in opposite directions respectively relative to said frame, whereby said spindle unit may be clamped against rotation relative to said frame without turning it on its axis, said clamping ring cooperating with said preloaded bearings in rigidly supporting a workpiece in a position predetermined with a high degree of accuracy.

12. In a dividing head, a frame presenting a rigid semi-circular cradle bearing, a movable member having a journal portion complementary to and disposed to rotatably engage said cradle bearing, means for clamping said movable member to said frame comprising a pair of resilient quadrant sectors each secured at one end to said frame, said sectors being positioned at the respective sides of said cradle bearing in continuation of its bearing surface with the free ends thereof closing into proximate spaced relationship and jointly substantially encircling said journal, and means disposed to engage said free ends of said quadrant sectors and operative to draw said ends toward each other for contracting said sectors upon said journal with equalized pressure, whereby said journal may be forced into gripping engagement with said rigid cradle bearing to clamp said movable member without disturbing its predetermined position relative to said frame.

13. In a dividing head, the combination with a frame and a member presenting a cylindrical periphery rotatably carried by said frame, of means for clamping said rotatable member in predetermined position relative to said frame, comprising a pair of substantially semi-circular clamping shoes each complementary to the cylindrical periphery of said rotatable member and each having a lug at each end, said shoes being positioned to substantially encircle said cylindrical member with said lugs at the respective adjacent ends thereof arranged in diametrically disposed spaced pairs, a pair of abutments on said frame disposed to engage the adjacent lugs constituting one pair thereof in manner to retain said lugs loosely therebetween and to limit movement thereof away from each other, and means disposed to engage the adjacent lugs constituting the other pair thereof and operative to draw them toward each other thereby moving said first lugs apart into engagement with said abutments and then contracting said shoes upon said cylindrical member with equalized pressure, whereby said member may be clamped in a predetermined position without exerting force thereon tending to displace it relative to said frame.

14. In a dividing head having a frame and a member presenting a cylindrical periphery rotatably carried by said frame, means for clamping said rotatable member in predetermined position relative to said frame, comprising a pair of arcuate clamping elements each complementary to the cylindrical periphery of said rotatable member, said elements being positioned to substantially encircle said cylindrical member with their respective adjacent ends arranged in diametrically disposed pairs, means on said frame to loosely engage the adjacent ends of said elements constituting one pair in manner to limit movement thereof away from each other, and means to engage the adjacent ends of said elements constituting the other pair thereof and operative to draw said ends toward each other thereby moving said first pair of ends apart into engagement with said limiting means and subsequently clamping said elements about said cylindrical member with equalized pressure.

15. In an indexing head having a frame and a member presenting a cylindrical periphery rotatably supported by said frame, means for clamping said member to said frame comprising a discontinuous resilient clamping ring disposed to loosely encircle the cylindrical periphery of said rotatable member and presenting spaced end portions, a pair of independent clamping members movably mounted on said frame and disposed to engage the respective ends of said clamping ring, and means operative to move said clamping members simultaneously and equally relative to said frame in direction to move the ends of said clamping ring toward each other equal distances relative to said frame to contract said ring into clamping engagement with said cylindrical member without displacing said member.

16. In a dividing head having a frame and an element rotatable on said frame about a horizontal axis, a clamping device for clamping said element to said frame in predetermined position including an annular clamping ring encircling said element and presenting a severing opening in its upper side, and a pair of interconnected independent actuating members mounted on said frame and arranged to act upon the respective ends of said ring from opposite directions simultaneously to contract said ring in manner tending to close said opening equally relative to said frame from each side thereof, whereby said clamp is caused to grip said rotatable element without exerting thereon forces tending to turn said element from its predetermined position.

ELLA MORTON KEARNEY,
ALBERT J. PITMAN,
OTTO W. CARPENTER, Jr.,
*Executors of the Last Will and Testament of Edward J. Kearney, Deceased.*
JOSEPH B. ARMITAGE.